Patented May 18, 1937

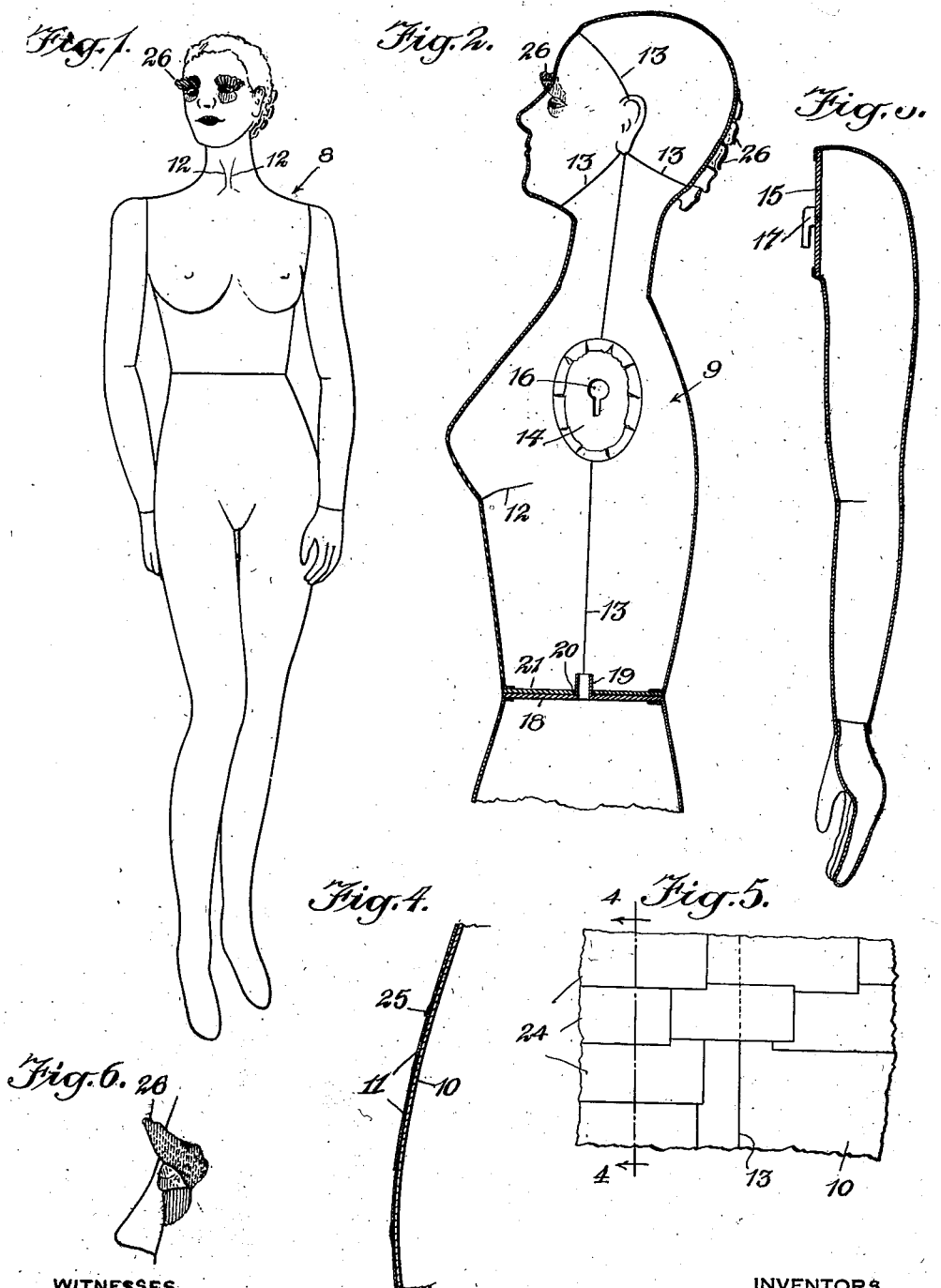

2,081,071

UNITED STATES PATENT OFFICE 2,081,071

ORNAMENTAL OBJECT AND METHOD OF MAKING THE SAME

Cora L. Scovil, New York, and Lillian L. Greneker, Mount Kisco, N. Y.

Application January 7, 1936, Serial No. 57,890

5 Claims. (Cl. 18—59)

This invention relates to improvements in ornamental objects and method of making the same and relates more particularly to ornamental objects made from transparent materials.

It is an object of the invention to provide an improved ornamental article, made of transparent material, of unusual and attractive appearance and which is of rugged substantial construction so that it can be used, among other things, as a manikin or display figure for displaying articles of merchandise.

Another object is to provide an ornamental article made of transparent cellulose and cellulose derivatives so fabricated as to present an attractive and unusual appearance and which can be molded and formed in the process of manufacture in a great variety of shapes and designs and which, when completed, is of rugged, strong construction capable of resisting disintegration and wear.

Among other objects is the provision of an improved method of making ornamental objects from transparent materials, especially from transparent cellulose and cellulose derivatives which is relatively simple and inexpensive to carry out and which permits of the fabrication of articles of unusual and attractive appearance.

For a full understanding of the invention reference should be had to the accompanying drawing in which—

Fig. 1 is a view of a manikin or display figure embodying our invention;

Fig. 2 is a side view in section of the upper portion of the manikin shown in Fig. 1;

Fig. 3 is a sectional view of the arm of the manikin;

Fig. 4 is a detail view in section on the line 4—4 of Fig. 5 showing the manner in which the article is constructed;

Fig. 5 is a detail view of a portion of the manikin showing the construction thereof; and Fig. 6 is a detail view of a portion of the face of the manikin showing how eyebrows and the like may be formed.

In the accompanying drawing the invention is illustrated as embodied in a manikin or display figure 8 of the type commonly employed in department stores for displaying articles of wearing apparel, in which use our invention finds particular application. However, it is to be understood that our invention may be employed in the construction of other ornamental objects.

Objects made in accordance with our invention preferably have transparent sides or walls 9 which are formed of two layers of material, as shown more clearly in Figs. 4 and 5, i. e., an inner layer 10 formed of a transparent plastic material, such as cellulose acetate or other plastic esters or ethers of cellulose, and an outer layer 11 of transparent material which is unaffected by ordinary solvents and by mildly high temperatures, such as regenerated cellulose, which is commonly known by the trade-mark name of Cellophane.

In forming any desired object, in accordance with our invention, sheets of the plastic material forming the inner layer 10 are first rendered plastic, either by heat or a suitable solvent, and are then molded and shaped, either over a mold or in a die, to the desired form. As the inner layer forms the foundation or main support for the article, the sheets of plastic material employed should be of sufficient thickness to insure the desired strength in the finished article. In making a manikin or display figure, as shown in the accompanying drawing, we have found that sheets of transparent cellulose acetate approximately thirty-one thousandths of an inch in thickness produce very satisfactory results, although the thickness may be varied considerably. The sheets need not be pure cellulose acetate but may contain other ingredients, such as plasticizing agents; or instead of cellulose acetate, other transparent materials which are hard and unworkable under normal atmospheric conditions but which can easily be rendered plastic by heat or solvents, may be employed, such as cellulose nitrate or other esters or ethers of cellulose.

The sheets of cellulose acetate or similar material may be rendered plastic either by means of heating or by suitable solvents such as acetone, triacetin or methyl cellusol. The softening or plasticizing action should be carried on until the cellulose acetate or similar material is pliable and can be stretched and worked but should be stopped before the cellulose acetate becomes fluid or liquid. We have found that very satisfactory results are produced by placing the sheets of cellulose acetate or similar material in a bath consisting of substantially two parts of water and one part of acetone and permitting it to remain therein at normal room temperature for approximately half an hour. When the sheets of material have thus been rendered plastic and workable, they are shaped either over a mold or in a die to any desired configuration.

In making a manikin, as shown in the accompanying drawing, it is preferable to make the arms, bust and head separately and the hips and both legs as a unit. In making each of the sections sheets of the plastic material are formed and shaped over a suitable mold or in a suitable die, the edges of adjoining sheets of the plastic material being secured together, as by means of an adhesive which may be formed of the cellulose acetate or other material, of which the sheets are composed, dissolved in a suitable solvent such as acetone. The adhesive is applied to the seams or joints in sufficient quantities so that when the acetone evaporates adjacent sheets will stick together.

To produce the desired curvatures and contracted portions gores and creases illustrated at 12 may be formed in the material. When the plastic material has been carefully worked to the desired shape it is permitted to set in the mold or in the die until it becomes hard and unworkable.

To remove each of the units from the molds or dies after they have hardened they are then slit, preferably along straight lines, as illustrated at 13 in the drawing, so as to form sections which may readily be removed from the molds or dies. The sections of each unit are then properly fitted together and secured in position, either by heating the edges of the material to render them plastic enough to adhere together, or preferably by means of an adhesive formed of the cellulose acetate or other material dissolved in a suitable solvent such as acetone and applied to the seams in sufficient quantities to insure adhesion.

The various units comprising the manikin, or other object which is being formed in accordance with the present invention, may be secured together in any desired means. Thus, in the manikin illustrated herein the head and bust portions are adhesively secured together in the manner described above so as to form, when finished, one unit. In the armhole openings and at the upper ends of the arms are fitted plates 14 and 15 which are secured together by suitable connectors comprising the key hole opening 16 in the armhole plate and the projecting lug 17 in the arm plate adapted to fit into the key hole opening and be retained thereby in position. The upper end of the hip and leg portions is preferably provided with a transverse plate 18 made of transparent material, such as regenerated cellulose or cellulose acetate or other cellulose derivatives, and which is provided with an upstanding projecting member 19 in its central portion adapted to fit into and engage an opening or socket 20 formed in a similar plate 21 provided at the lower end of the bust portion. Of course, if desired, adhesives may be used between the plates 18 and 21 to make the figure more rigid.

When the foundation or inner layer has thus been formed of plastic material by molding it to the desired shape, permitting it to set, removing it from the mold or die by slitting it into several sections and then reuniting the several sections to form the foundation, the outer layer 11 of transparent material is formed. The outer layer is formed of a transparent material which is preferably unaffected by ordinary solvents and by mildly high temperatures and for this purpose we prefer to employ relatively thin sheets of regenerated cellulose commonly known by the trade-mark name of Cellophane.

The film of regenerated cellulose is preferably cut into relatively small patches or strips indicated at 24 which are carefully fitted over the foundation layer of plastic material and secured thereto by a suitable adhesive which is preferably transparent and of relatively light body so as to interfere as little as possible with the appearance and shape of the article.

As is shown more clearly in Fig. 4 the patches or strips 24 are preferably applied in overlapping relation so that each strip or patch will overlap or underlap to a very slight extent the abutting strips or patches. The patches should be very carefully fitted and applied, especially to the curved portions of the article, so as to not distort the contour thereof. It is also desirable in applying the patches or strips over the foundation layer to arrange them so that the patches extend over the seamed portions 13 as shown in Fig. 5. The lower right corner of Fig. 5 illustrates the foundation layer with the outer patches or strips removed, clearly showing the seam 13 which extends upwardly, and near the top of this view the patches 24 are shown extending across the seam so as to strengthen and reenforce it.

When our invention is embodied in a manikin or display figure, as shown in the accompanying drawing, the eyes, eyebrows, hair and lips may be made from pieces of regenerated cellulose film of the proper color and shaped and adhesively secured to the figure to give the desired impression, as indicated by the numeral 26 in the drawing. The ornamental article described herein has an unusual and attractive appearance due to its transparency and to the slightly mottled high light effect produced by the outer patch work covering. Due to the fact that the foundation layer is made of a plastic material it can be formed in attractive and artistic shapes and designs. It is also of rugged and strong construction and will resist disintegration and corrosive action due to the outer protecting layer of regenerated cellulose which also serves to retain the article in proper shape.

It also will be seen that the method herein described is relatively simple and inexpensive to carry out and permits of the production of an improved ornamental article which may be formed in a great variety of shapes and designs.

It is to be understood, of course, that many modifications may be made in the illustrated and described embodiment of our invention without departing from our invention and that while our invention is illustrated as applied to a manikin or display figure it may be employed in many other types of ornamental articles, such as dolls, novelties and the like. It is also to be understood that ornamental objects embodying our invention may have a solid rather than hollow foundation portion or may be stuffed with some suitable material such as transparent Cellophane.

We claim:

1. A display manikin comprising a hollow foundation portion composed of a layer of transparent plastic cellulose derivative formed in the shape of the manikin and an outer protecting layer formed of overlapping patches of transparent preformed film fitted over and secured to the layer of cellulose derivative.

2. A display manikin comprising a hollow foundation portion composed of a layer of transparent plastic cellulose derivative formed in the shape of the manikin, an outer protecting layer formed of overlapping patches of transparent preformed film fitted over and secured to the layer of cellulose derivative and simulations of hair and eyebrows formed on said manikin from strips of regenerated cellulose film.

3. The method of forming a transparent ornamental object comprising first forming a hollow foundation portion by molding sheets of a transparent plastic cellulose derivative into a hollow shell of the desired shape of the article, then securing relatively small patches of transparent regenerated cellulose film over the surface of the foundation portion.

4. The method of forming a transparent ornamental object comprising first rendering sheets of a transparent plastic cellulose derivative workable, next forming a hollow foundation portion by molding the sheets while so workable into a hollow shell of the desired shape of the article, then securing relatively small patches of preformed film in overlapping relation over the surface of the foundation portion.

5. An ornamental object comprising a hollow foundation portion composed of a layer of transparent plastic cellulose derivative formed in the shape of the object, and an outer protecting layer formed of relatively small overlapping patches of transparent preformed film fitted over and secured to the layer of cellulose derivative.

CORA L. SCOVIL.
LILLIAN L. GRENEKER.